UNITED STATES PATENT OFFICE.

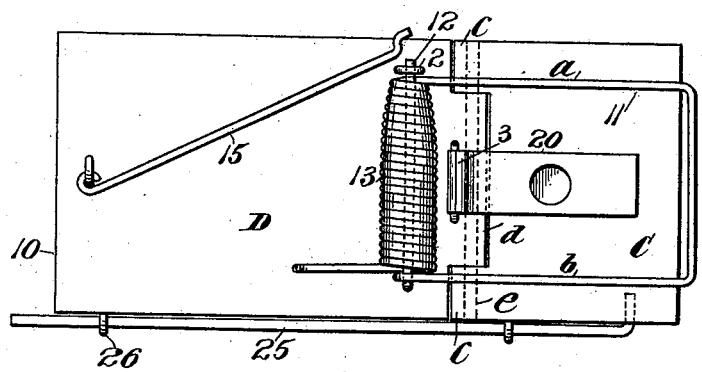

EDWARD S. HOTCHKISS, OF BRIDGEPORT, CONNECTICUT.

ANIMAL-TRAP.

SPECIFICATION forming part of Letters Patent No. 615,218, dated November 29, 1898.

Application filed June 15, 1898. Serial No. 683,464. (No model.)

*To all whom it may concern:*

Be it known that I, EDWARD S. HOTCHKISS, a citizen of the United States, residing at Bridgeport, county of Fairfield, and State of Connecticut, have invented certain new and useful Improvements in Animal-Traps, fully described and represented in the following specification and the accompanying drawings, forming a part of the same.
This invention relates to animal-traps of that class in which the animal is caught by means of a spring-actuated jaw, which descends upon and catches the animal between said jaw and the base of the trap.
The invention aims generally to improve the construction of such traps, and especially to provide an improved means for releasing an animal which has been caught.

As a full understanding of the invention can best be given by a detailed description of a preferred construction embodying the same, such a description will now be given in connection with the accompanying drawings, showing such a preferred construction.
In said drawings, Figure 1 is a plan view of the preferred form of trap, showing the parts in sprung or unset position. Fig. 2 is a side view showing the trap set. Fig. 3 is a side view showing the parts in position after the trap has been sprung and the releasing devices have been moved to releasing position.

Referring to the drawings, the base 10 is formed of wood or other suitable material and is preferably of about the form shown. The jaw 11 is pivotally connected to the base on a line extending transversely of the base and nearly midway between the ends thereof. It is preferably formed of a loop of spring-wire, the central or outer portion of which loop preferably extends parallel with the end of the base 10, and is preferably pivoted to the base by means of a pin or mandrel 12, formed from a rod or wire, one end of which is secured to the base by being bent at right angles and driven into or through the base and the other end of which is secured by means of a staple or screw-eye 2.

The spring 13 for exerting tension on the jaw is preferably formed from the same piece of wire from which the loop forming the jaw is formed, the wire beyond the side *a* of the jaw being coiled to form the spring 13, extending at right angles to the side *a* about the pin 12 and preferably of a length nearly equal to the distance between the sides *a* and *b* of the jaw. From the other end of the spring the end of the wire extends rearwardly to engage the base 10 under tension, being preferably secured to the base, as by having its end turned at right angles and inserted in the base. The other side *b* of the jaw is pivotally connected to the pin 12 beyond the dead end of the spring, as by having its end formed into an eye, through which the pin 12 passes.

A setting-bar 15 is pivotally connected to the base, as by the universal joint formed by an eye and loop, as shown, at a distance from the pin 12 slightly greater than the length of the jaw and is of a length sufficient to extend over and slightly forward of the spring 13 to engage the catch of a trigger 20, pivoted to the base just in front of the spring 13. The trigger 20 may be of any suitable construction, having a catch 3 for engaging the end of the setting-bar 15 and a forwardly-extending arm 4, which carries the bait and through which the trigger is operated. The specific form of trigger shown is described and claimed in my application, Serial No. 683,465, filed June 15, 1898.

The base 10 is formed in two parts, the forward portion C, or the part which coacts with the jaw, being hinged to the main portion D thereof, so that after the trap has been sprung this forward portion beneath the jaw may be swung down away from the jaw to release the animal which has been caught. This hinged connection between the parts of the base is preferably formed by cutting the end of the main portion D of the base away to form a central projecting portion *d*, the end of the hinged part C being recessed to receive the projecting portion *d* and to form ears or parts *c*, extending on either side of the part *d*, and by connecting the parts *c* and *d* by means of a pivot-pin *e*. The lower edges of the parts *c d* are rounded off, as shown; but the upper edges are preferably left square to form stops to prevent further upward movement of the part *c* of the base after it has been moved into position in line with the part *d*.

For the purpose of holding the parts *c* and d in line and for swinging the part c downward when desired I provide the part c with a rearwardly-extending arm 25 and provide the part d with means for engaging said arm to hold the two parts of the base in line. This arm 25 preferably extends from one edge of the part C and when the parts are in normal position in line lies along the corresponding edge of the part D and is held from rising past said edge by a catch, which is preferably simply a hook 26, beneath which the arm 25 engages, the arm being preferably a spring-arm to permit its being sprung downwardly and outwardly to clear the hook 26 when it is desired to raise it to swing the part C downward. Two such arms 25 may be provided, one on either edge of the base; but one will generally be sufficient, especially in small traps.

The trap is set by turning the jaw 11 about the pin 12 from the position shown in Fig. 1 to that shown in Fig. 2 and bringing the setting-bar down over the jaw and engaging its front end beneath the catch 3 of the trigger 20, as shown in Fig. 2. Downward movement of the trigger will then release the bar 15, which will fly up and set the jaw free, allowing it to snap back down onto the forward portion of the base, so as to catch between it and the base the animal which has moved the trigger. When it is desired to release the animal which has been caught, the arm 25 is moved clear of the hook 26 and then raised to swing the forward part C of the base downward, as to the position shown in Fig. 3, the jaw being meanwhile prevented from following the part C of the base in its downward movement by engagement with the portion of the main part D of the base extending forward of the pin 12 or with the ears c of the part C, as is evident from the drawings.

It will be understood that I am not to be limited to the exact construction shown for the purpose of illustrating my invention, but that the invention includes changes and modifications thereof within the claims.

What I claim is—

1. An animal-trap having a spring-actuated jaw, a base on which said jaw is mounted having a part which coacts with the jaw, and means for moving said part of the base away from the jaw when the jaw is in its sprung position, substantially as described.

2. An animal-trap having a spring-actuated jaw, and a base on which said jaw is mounted having the part which coacts with the jaw hinged to swing away from the jaw when the jaw is in its sprung position, substantially as described.

3. An animal-trap having a spring-actuated jaw, a base on which said jaw is mounted having the part which coacts with the jaw hinged to swing away from the jaw when the jaw is in its sprung position, and means for holding said hinged part in position to coact with the jaw and for releasing said part to permit it to swing away from the jaw, substantially as described.

4. An animal-trap having a spring-actuated jaw, a base on which said jaw is mounted having the part which coacts with the jaw hinged to swing away from the jaw when the jaw is in its sprung position, means for swinging said part away from the jaw, and a stop for preventing the jaw moving with said part as it swings, substantially as described.

5. An animal-trap having a spring-actuated jaw, a base on which said jaw is mounted having the part which coacts with the jaw hinged to swing away from the jaw when the jaw is in its sprung position, and an arm extending rearwardly from said hinged part for swinging said part away from the jaw, substantially as described.

6. An animal-trap having a spring-actuated jaw, a base on which said jaw is mounted having the part which coacts with the jaw hinged to swing away from the jaw when the jaw is in its sprung position, an arm secured to one edge of said hinged part and extending rearwardly therefrom for swinging said part away from the jaw, and a catch on the other part of the base to engage said arm to hold the hinged part in position to coact with the jaw, substantially as described.

7. An animal-trap having a spring-actuated jaw, a base on which said jaw is mounted having the part which coacts with the jaw hinged to swing away from the jaw when the jaw is in its sprung position, stops limiting the upward movement of said hinged part when in position to coact with the jaw, a spring-arm secured to said hinged part and extending rearwardly therefrom for swinging said part away from the jaw, and a hook 26 on the other part of the base to engage said arm to hold the hinged part in position to coact with the jaw, substantially as described.

8. An animal-trap having a base 10 formed of two parts C and D having their meeting edges provided with ears c and a central projection d respectively and connected by a pivot-pin e, a spring-actuated jaw mounted on the part D to coact with the part C, and means for holding the part C in position to coact with the jaw and for swinging said part away from the jaw when the jaw is in its sprung position, substantially as described.

In testimony whereof I have hereunto set my hand in the presence of two subscribing witnesses.

EDWARD S. HOTCHKISS.

Witnesses:
ERNEST P. LYON,
D. FAIRCHILD WHEELER.